UNITED STATES PATENT OFFICE.

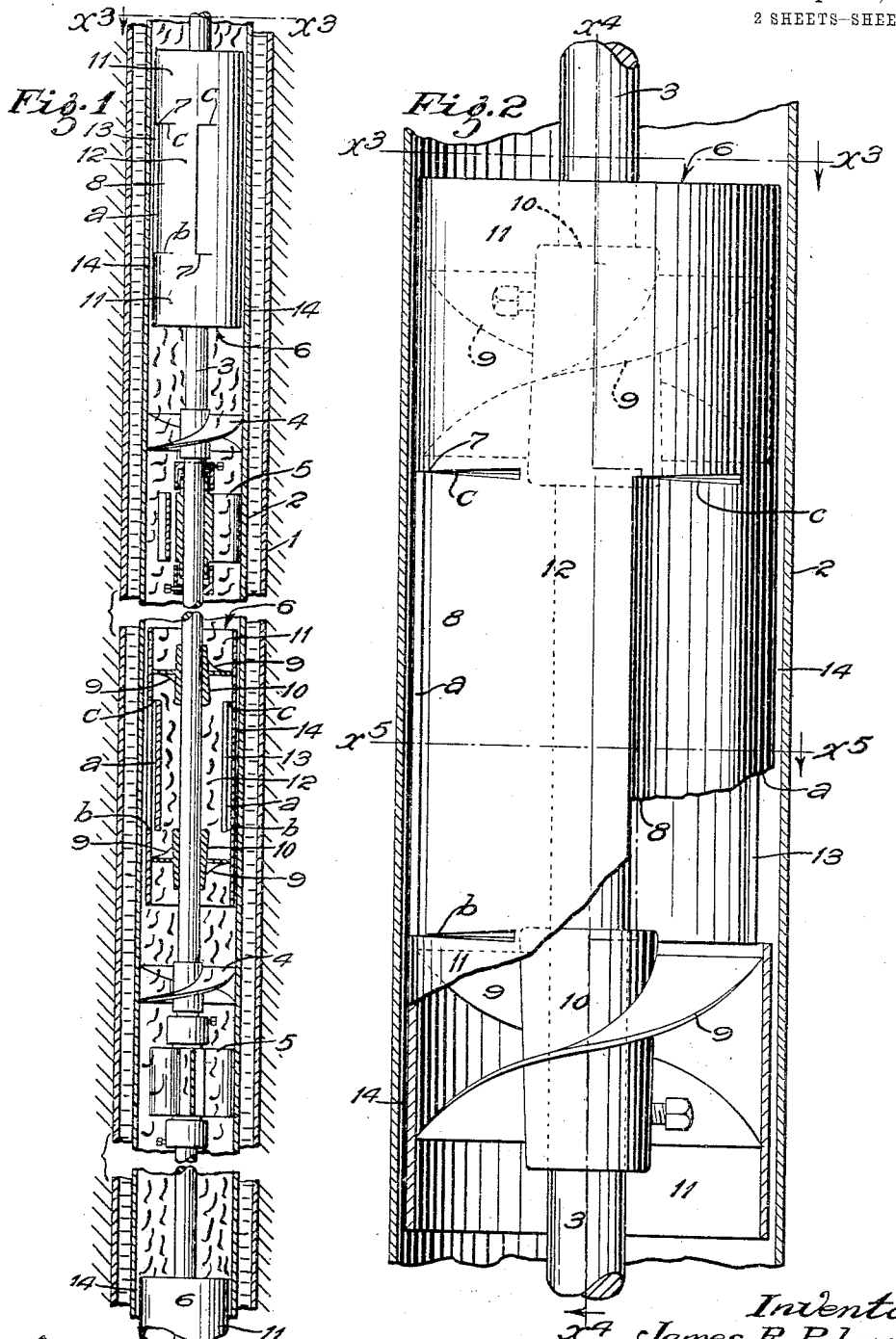

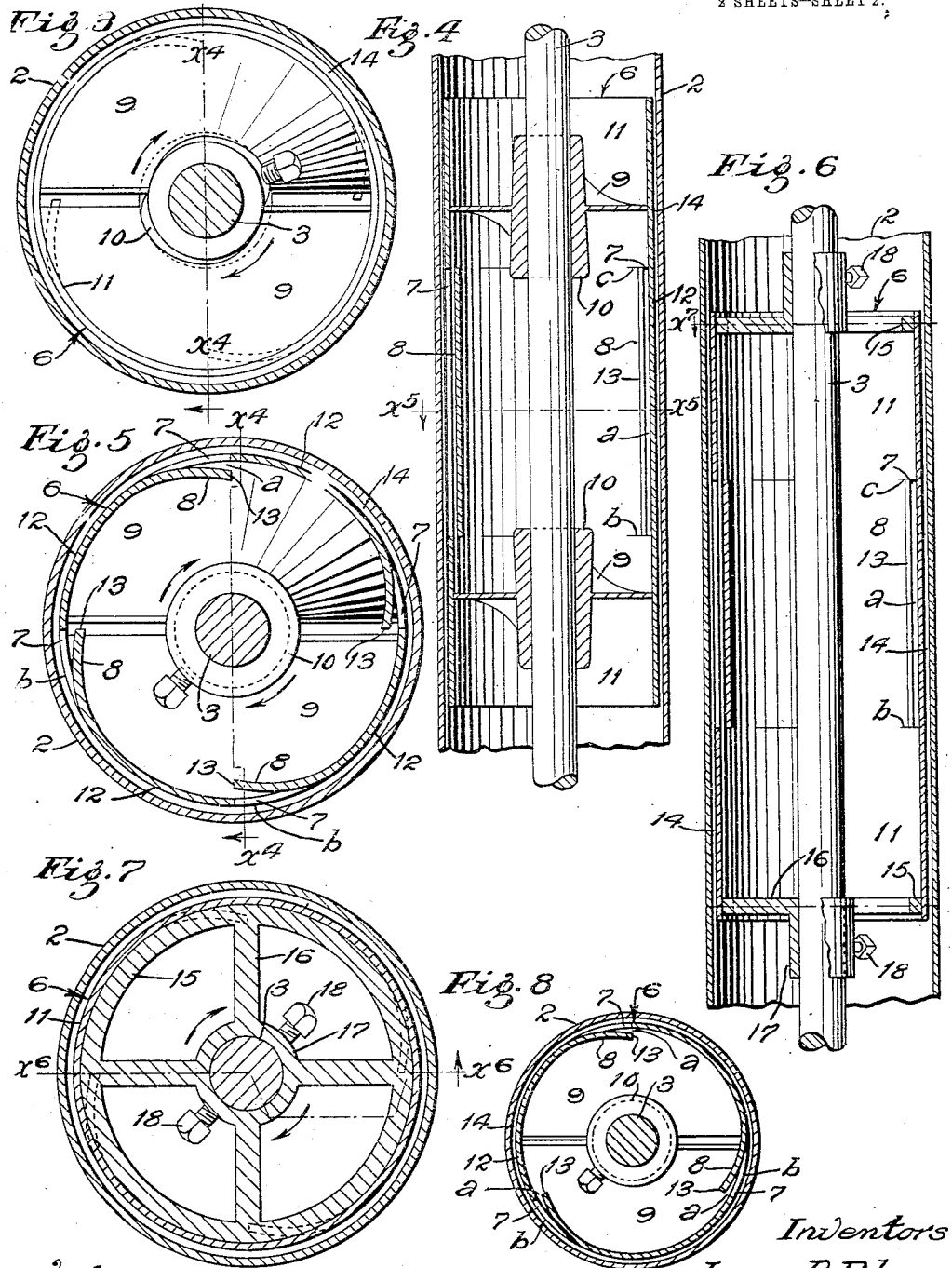

JAMES R. PALMER AND FENN H. PALMER, OF SAN BERNARDINO, CALIFORNIA.

SELF-CENTERING HYDRAULIC BEARING FOR PUMP-SHAFTS.

1,110,569.  Specification of Letters Patent.  Patented Sept. 15, 1914.

Application filed August 19, 1913.  Serial No. 785,557.

*To all whom it may concern:*

Be it known that we, JAMES R. PALMER and FENN H. PALMER, both citizens of the United States, residing at San Bernardino, in the county of San Bernardino and State of California, have invented a new and useful Self-Centering Hydraulic Bearing for Pump-Shafts, of which the following is a specification.

This invention relates directly to the provision of bearings for the rotary shafts of propeller and centrifugal pumps, but may be applied in other situations.

An object of this invention is to provide superior easily installed means for holding pump shafts in true alinement inside pump tubings.

Heretofore it has been deemed necessary where bearings were required to hold in true alinement the vertical shafts of propeller pumps, to support said bearings by actual contact with the tubing through which the rotary shaft extended. There are various difficulties to be overcome with such former construction, among which may be mentioned the difficulty of oiling the bearings that are below the top of the well.

An object of this invention is to overcome all such difficulties and to provide a bearing which may be lowered indefinitely within the well tubing, and which may be adjusted up and down with great ease and convenience and disposed in place in the well tubing and to allow the liquid from below to pass up through the tubing with minimum amount of friction and obstruction.

We have discovered that if a rotating sleeve is placed inside a tube and is provided with orifices and with means inside the sleeve to direct liquid through the orifices to impinge upon the inside walls of the tubing, the hydraulic pressure created between the sleeve and the tubing will tend to hold the sleeve away from the tubing, and that if such orifices and impellers are properly disposed symmetrically around the sleeve there will be a balancing effect whereby the pressures around the sleeve will tend to hold the sleeve in central position; and that by fixing such sleeve to the rotating shaft said shaft will be held true.

It is evident that different forms of impellers may be employed in carrying out our invention, and we therefore regard this invention as broadly new and pioneer, and we do not limit ourselves to specific construction.

Broadly considered, the invention comprises, in a hydraulic bearing for a shaft within tubing containing liquid, a curved surface concentric with and fixed to and revolving with the shaft, and means to force liquid between said surface and the tubing; and in carrying out the invention we prefer to provide for each bearing a sleeve having two cylindrical elements concentric with and fixed to the shaft and a plurality of inwardly extending tangential members in combination with segmental sections of the sleeve, arranged between the cylindrical elements, whereby liquid will be taken from the space between the shaft and the sleeve and forced into the annular space between the cylindric surfaces of the sleeve and the tubing, as will more fully appear from the subjoined detail description.

The accompanying drawings illustrate the invention.

Figure 1 is a fragmental elevation partly in section illustrating this invention as installed in a well in connection with a propeller pump. Fig. 2 is an enlarged view of a portion of the same, parts being broken away to expose interior construction. Fig. 3 is a plan section from line $x^3$, Figs. 1 and 2. Fig. 4 is an axial section on line $x^4$, Figs. 2, 3 and 5. Fig. 5 is a transverse section on line $x^5$, Figs. 2 and 4. Fig. 6 is an irregular sectional elevation from line $x^6$, Fig. 7, of a construction of bearing different from that shown in the preceding views. Fig. 7 is a plan section on line $x^7$, Fig. 6. Fig. 8 is a plan section through the wings of a form of the invention in which three blades are employed, being symmetrically disposed around the axis.

The usual joints for the casing, tubing and shaft are omitted from the views but are to be understood.

The well casing 1, pump tubing 2, rotary shaft 3, propeller 4 and water stops 5 are of the usual construction, said stops 5 frictionally contacting with the tubing 2 but not contacting with the shaft 3, the purpose thereof being as heretofore to stop the whirling motion of the water preparatory to its being taken up by the propeller 4.

The bearing to which this invention relates may, as shown in Figs. 1 to 5, inclusive, comprise a sleeve 6 with orifices 7 produced by cutting out of and pressing in from the body of the sleeve a tongue to constitute the wing 8. A number of these wings are provided and disposed in balancing position around the periphery of the sleeve, there being shown in most of the drawings four such wings for each sleeve, all being the same size and arranged in pairs, the members of which are diametrically opposite each other as clearly seen in Fig. 5. In Fig. 8 only three such wings are employed. Said sleeve in the construction shown in Figs. 1 to 5, inclusive, is spaced from and fixed to the shaft 3 by helical blades 9 that have a circular contour and that fit the interior cylindrical walls of the sleeve 6, which sleeve in the process of construction is shrunk onto said circular blades, the purpose being to provide a large bearing surface that will tend to hold the sleeve in true cylindrical form and to avoid obstruction of liquid passing through the tubing. Said blades are mounted on hub means 10, there being shown two blades for each hub and there being two hubs with their sets of blades for each sleeve, said sleeve having straight cylindrical portions 11 at each end to fit the blades 9 above and below the orifices 7 from which the wings 8 have been struck. These cylindrical portions form elements having curved surfaces concentric with the tubing and with the shaft.

Preferably the wings 8 are of rectangular form, being produced by the longitudinal cut $a$ and the two transverse cuts $b$, $c$, that are of equal length with each other and extend at right angles to the cut $a$ and part way around the periphery, thus leaving between any two orifices 7, a segment 12 of a cylinder; the several segments 12 being symmetrically disposed where an even number of wings is employed the wings and also the cylindric surfaces formed by the segments are arranged in pairs the members of each pair being diametrically opposite each other as clearly seen in Fig. 5.

The sleeve may be made of any suitable material, preferably of stiff sheet iron, steel or other suitable metal which will hold its shape under the pressures and strains to which the appliance may be subjected. The vertical edges 13 may be beveled or sharpened to cut the liquid with minimum resistance.

The operation with the forms shown in Figs. 1 to 5, inclusive, is practically as follows when the rotation of the shaft 3 is in the direction toward which the free edges of the wings project. That is to say, the propeller blades 4 and the liquid stops 5 act in the usual way to cause the liquid to flow up the tube, and at the same time the sleeves fixed to the shaft rotate likewise and the inwardly projecting wings 8 cut into the liquid and by reason of the tangential arrangement of said wings causes the liquid to be impelled outward with considerable force through the orifices 7 into the space 14 between the cylindrical faces or segments 12 and the cylindrical internal walls of the tube 2, the result being that by this means considerable hydraulic pressure is exerted between the tubing and the balanced cylindrical segments, and this pressure being applied upon opposite sides by corresponding means symmetrically arranged around the axis steadily holds the sleeve, and consequently sustains the shaft in central position without any direct contact with the tubing.

By means of the helical arrangement of the supporting blades 9 the sleeve is connected to the shaft in such a manner as to minimize the friction of the water in its passage through the sleeve. In the form shown in Figs. 6 and 7 the sleeve is supported at its ends by a ring 15 connected by spokes 16 with the hub 17 fitted on the shaft 3 and fixed thereon with the set-screws 18. In this form the sleeve may be fastened to the ring 15 by rivets 19. The sides of the spokes are preferably inclined to cut through the liquid to avoid obstructing its passage.

It is understood that any number of blades may be employed symmetrically disposed around the sleeve, there being shown four in Figs. 1 to 5, inclusive, and only three in Fig. 8.

It is understood that the uninterrupted full cylindric surfaces shown at 11 effectively receive the hydraulic pressure produced by the action of the wings on the liquid and that these elements or cylindric surfaces shown at 11, being spaced apart from the tubing and from the shaft are, in the form shown, the most important shaft centering surfaces and serve to apply the hydraulic force to steady the shaft and hold it in true central position.

We claim:—

1. In a hydraulic bearing for a shaft within tubing containing liquid, curved surfaces concentric with, spaced from, fixed to and revolving with the shaft and spaced from the tubing, and means to force liquid between said surfaces and the tubing.

2. In a hydraulic bearing for a shaft within tubing containing liquid substantially as set forth, a sleeve fixed to the shaft and revolving therewith and having curved surfaces concentric with the shaft and spaced apart from the shaft and tubing, and also having means to act upon the liquid to force the same into the space between said concentric curved surfaces and the tubing.

3. The hydraulic bearing for a shaft within tubing containing liquid substantially as set forth comprising a sleeve fixed to the shaft and having curved surfaces spaced from and concentric with the tubing, and means revolving with the shaft to force liquid into the space between said surfaces and the tubing.

4. The combination with tubing filled with water and a shaft inside the tubing, of cylindric faces symmetrically disposed between and spaced apart from the shaft and tubing, and means rotating with the shaft to force liquid into the space between said faces and the tubing.

5. The combination with a shaft and tubing around the shaft adapted to convey liquid, of a cylindrical sleeve fixed to the shaft and provided with cylindric faces slightly spaced apart from the tubing, and means carried by the sleeve to force liquid from the interior of the sleeve into the spaces between said faces and said tubing.

6. The combination with a shaft and tubing adapted to contain water around the shaft; of a sleeve provided with orifices, with inwardly extending tangential wings at the orifices and with cylindric faces between the orifices; and means to fix the sleeve to the shaft.

7. The combination with a shaft and tubing adapted to contain water around the shaft; of a sleeve provided with orifices; tangential wings at the orifices and cylindric faces between the orifices; hub means connected with the shaft; and helical blades connected with the hub means and fitted and fastened to the inside walls of the sleeve.

8. In a hydraulic bearing for a shaft inside liquid containing tubing, hub means fixed to the shaft, helical blades on the hub means, the peripheries of said blades being circular, and a sleeve having cylindrical portions shrunk on said blades and provided between said cylindrical portions with orifices, and inwardly projecting wings to catch liquid and force it outward as the shaft rotates.

9. The combination with a shaft and a tubing for containing liquid around the shaft, of hubs fixed to the shaft, helical blades on the hubs, a sleeve having cylindrical portions fixed to said blades, said sleeve being provided between said cylindrical portions with orifices, and inwardly projecting wings revolving with the hubs to catch liquid and force it outward as the shaft rotates.

In testimony whereof, we have hereunto set our hands at San Bernardino, California, this 13th day of August, 1913.

JAMES R. PALMER.
FENN H. PALMER.

In presence of—
N. A. RICHARDSON,
O. I. KENNEDY.